UNITED STATES PATENT OFFICE.

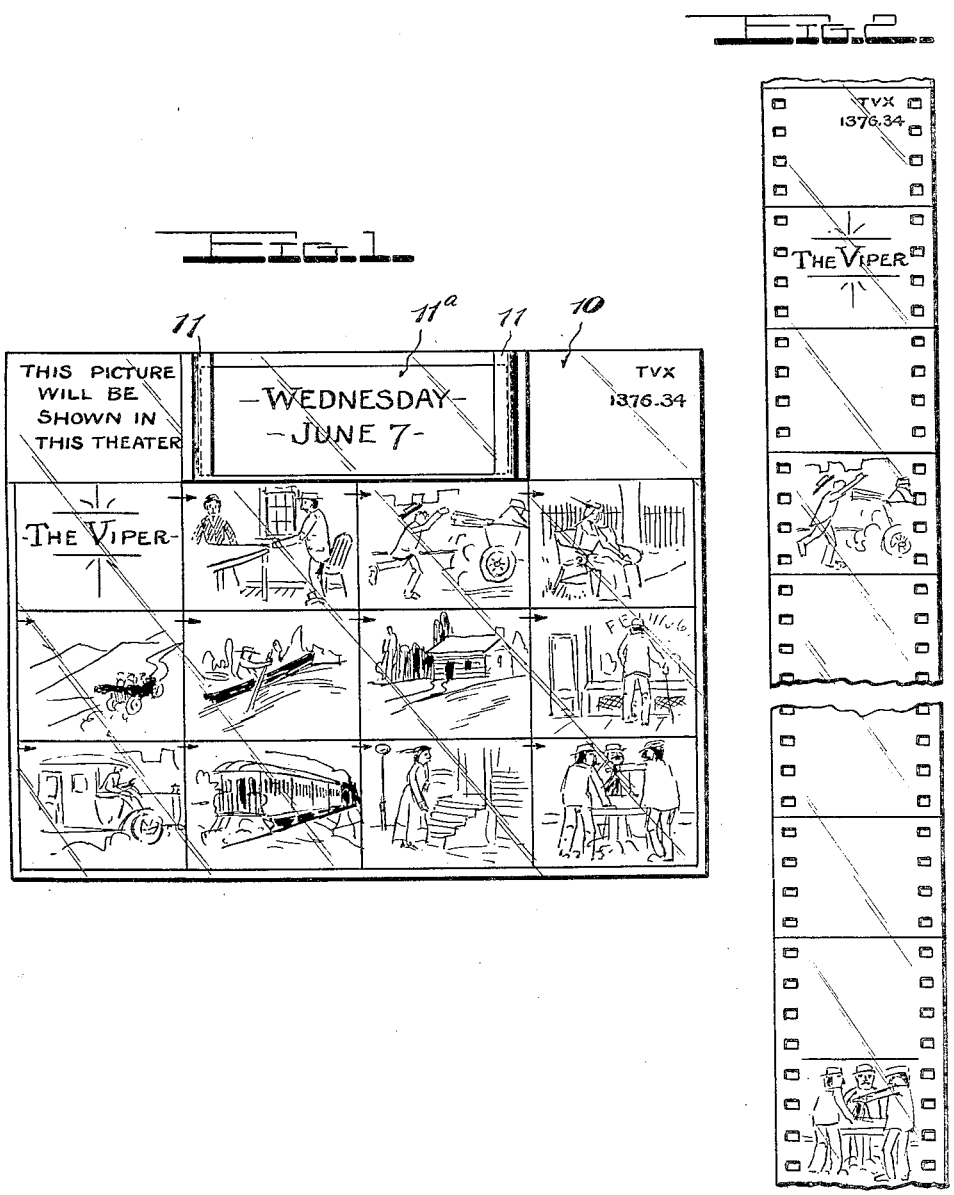

FRITZ LOWENSTEIN, OF BROOKLYN, NEW YORK.

SYSTEMATIC CLASSIFICATION AND INDEXING OF MOTION-PICTURE FILMS.

1,233,076.      Specification of Letters Patent.      Patented July 10, 1917.

Application filed June 12, 1916. Serial No. 103,187.

*To all whom it may concern:*

Be it known that I, FRITZ LOWENSTEIN, a citizen of the United States, residing at Brooklyn, in the county of Kings and State of New York, have invented certain new and useful Improvements in Systematic Classification and Indexing of Motion-Picture Films; and I do hereby declare the following to be a full, clear, and exact description of the invention, such as will enable others skilled in the art to which it appertains to make and use the same.

This invention relates to systematic classification and indexing of motion picture films.

Owing to the very large production of motion picture films, it has become very desirable for many purposes to have some system of classifying and indexing films for rapid identification and in such manner as to render available at a glance fairly complete condensed information about each film. Both the owners and users of films, as well as the general public, have need of some system which will give accurate information about large numbers of films with a minimum expenditure of time.

Heretofore the only method suggested for indexing motion picture films, so far as I am aware, has been by title or subject matter. But such a method gives very little real information concerning the character, artistic qualities or other features of the film; so that the utility of a catalogue or index of this kind is extremely limited. For example, the owner of a motion picture film exchange, by looking at a title index or card catalogue of his films, can tell whether or not he has a certain film of given title in stock; and the index card can of course give such other meager information about the film as is capable of being conveyed by a few words. In order to really form any judgment of the film, however, the film itself must be obtained and examined. But this takes an excessive amount of time, and the examination of films in large numbers by such a method is out of the question.

A similar difficulty arises, for instance, when the proprietor of a moving picture theater inquires of a film exchange regarding a film whose title he has secured from a catalogue but of which he has no actual knowledge. In order that he may really know whether or not the film is suitable for his purposes or comes up to his personal standard of artistic value the reel itself has to be sent to him by the film exchange, with the possibility that the film may after all prove disappointing and cause him considerable loss.

It is an object of the present invention to overcome the foregoing difficulties as well as others inherent in the practice heretofore prevailing with respect to classification and indexing of motion picture films and the dissemination of information concerning the same.

Another object is to greatly extend and broaden the comparatively narrow field of usefulness to which the crude classification methods and systems of prior practice have necessarily been limited. Other objects of the invention will appear as the disclosure proceeds.

The most important feature of my invention, in so far as it involves a novel product or article of manufacture, is a carrier of some appropriate material bearing views which are reproductions of, or which correspond to, chronologically non-consecutive views occurring on the particular film which it is desired to index or classify. This carrier may vary widely in form and character, depending upon the various purposes for which it may be designed. It may be in the form of a glass lantern slide, for example, or it may be a sheet of celluloid, cellite, or similar material. Most desirably this arrangement should be such that the carrier may be placed in a projecting lantern and the views exhibited on a screen.

The selected views should fairly represent the important scenes of the reel, and should ordinarily be arranged in regular sequence, corresponding to the sequence of views on the original film, in order that as much information as possible may be gained regarding the story or plot, assuming the film to portray a drama, for example. The number of views or scenes thus reproduced may vary considerably in practice, but for practical purposes it is necessarily small as compared to the number of pictures on the original film. The size of the reproduced scenes is most conveniently, though not necessarily, the same as that of the originals, that is to say, about three-quarters of an inch by an inch according to present practice. A dozen views of this size can readily be grouped on a regular 3"x4" lantern slide and still leave room for identification marks and miscellaneous data useful for cataloguing and other purposes.

For the sake of a concrete example of an article embodying the principles of the invention, typical forms which the article may assume are shown in the accompanying drawings, in which Figures 1 and 2 represent such typical forms more or less diagrammatically.

In Fig. 1, the carrier 10 is a card or sheet of celluloid of any convenient size, say 3 by 4 inches. The twelve reproduced views (including the film title) shown as occupying approximately the lower three-quarters of the card are selected from a thousand foot reel for instance, and they represent important and characteristic non-consecutive scenes of the film. In this example the sequence corresponding to that of the original scenes is from left to right, beginning at the top and going down; which may be indicated, if deemed desirable, by arrows, as shown, or in some other convenient way. The space above the pictures may be variously employed. In the present example the car or slide is designed first, as a catalogue or index card,—hence the Bruecke system library notation in the upper right hand corner; and second, as a lantern slide to be used by moving picture theaters to announce to their patrons a reel to be shown on subsequent days. At 11 may be provided retaining strips or the like forming a pocket for holding in place a removable transparent strip 11ª carrying dates or other variable matter. For other purposes, other appropriate legends may be employed.

A slide or card of this description is evidently adapted for a wide variety of uses other than as a lantern slide. Thus it is admirably suited for filing away in card index cabinets; and if a number of duplicates be made of the same car, a cross-index system can be kept. In practice, such a system enables indexing first, under the maker's name; second, under the title or leading actor (if any); third, under subject matter, such as "train collisions", "aeroplane flights", etc.; and so on. Furthermore, such slides may be arranged in any suitable manner so that the cards of an entire index section or class, for example, may be placed in a machine like a mutoscope and viewed directly in rapid succession; or they may be projected quickly one after another on a screen; thus enabling one to run through the essential contents of many films per minute, and at the same time to identify accurately the reel or reels desired. These same cards may be used for convenient inspection by censor boards; for public library indices; for copyright deposits; as catalogue sheets to be sent by the film exchanges to the theaters to enable the latter to select the kind of films they wish to obtain; and in many other ways.

In Fig. 2, the carrier is shown as a short section of an ordinary motion picture film strip upon which non-consecutive views have been reproduced from a picture film. In this instance, the selected views are supposed to be the same as those shown in the slide in Fig. 1, but for the sake of simplicity only the views corresponding to the third and last spaces in Fig. 1 have been shown in Fig. 2. Where the film strip is to be used independently of a motion picture film proper, several blank film spaces (not shown) are provided at the opposite ends of the film strip, whereby the strip may be properly guided and held in a projection machine in such manner that the views at the extreme ends of the series may be exhibited. The principal advantages of this form are that a carrier of this description is always readily obtainable; and that the form in which the reproduced views are presented renders the carrier especially suitable for use in conjunction with an ordinary motion picture film, as an opening or concluding announcement, for example. For most purposes, however, the slide shown in Fig. 1 is more useful.

In either form, the article constitutes a synopsized representation of the subject matter of a motion picture film which instantly gives visual information concerning the film otherwise impossible to obtain except by inspection of the film itself.

The collocation, upon a suitable carrier, of views selected as representative of the scenes depicted upon a motion picture film may be conveniently effected, for example, by photographing successively from the film upon a sensitized carrier the several views selected for reproduction, thus obtaining a negative from which can be printed as many positives of the lantern slide, index card, etc., as may be required. Various mechanical expedients may be employed for expediting the reproducing operation, but these form no part of the present application.

While I have hereinabove referred to "reproducing" non-consecutive views from a motion picture film, and while this is involved in the best practical applications of my invention at present known to me, it is not to be understood that the invention in its broadest aspect is limited to reproductions in the literal sense of the term. For instance, while a scenario is being enacted and the usual motion picture film thereof is being produced, snapshots of a number of the characteristic scenes, taken with a separate camera, may be grouped on a slide or index card as above described; and, since each picture on said card has its substantial counterpart in a view on the motion picture film taken at the same instant, the assemblage constitutes a condensed or summarized representation of a motion picture, consisting essentially of a group of scenes corresponding to chronologically nonconsecutive scenes on a motion picture film. This and other modifications can be resorted to without departing from the spirit of my invention, considered in its broadest scope; and such modifications are comprehended within the scope of the appended claims.

What I claim is:

1. As a new article of manufacture, a synopsized representation of the subject matter of a moving picture film which comprises picture-supporting means carrying a plurality of non-consecutive scenes from a motion picture film reproduced from said film in grouped arrangement and in relatively small compass, whereby said picture-supporting means is adapted for use in a filing system.

2. As a new article of manufacture, a flexible transparent picture support, in combination with a plurality of non-consecutive scenes from a motion picture film reproduced in adjacent arrangement on said picture support and in proper sequence with respect to their occurrence on said film.

3. As a new article of manufacture, a transparent sheet carrying thereon a plurality of photographic representations of non-consecutive scenes from a motion picture film, said sheet being of relatively small size and adapted for use in standard card index filing cabinets.

4. As a new article of manufacture, a synopsized representation of the subject matter of a motion picture comprising a suitable support carrying a plurality of scenes grouped together and corresponding, respectively, to non-consecutive scenes of said motion picture said support being of relatively small size and adapted for use in a filing system.

In testimony whereof I hereunto affix my signature.

FRITZ LOWENSTEIN.